US007873044B2

(12) United States Patent
Kang et al.

(10) Patent No.: US 7,873,044 B2
(45) Date of Patent: Jan. 18, 2011

(54) METHOD FOR TRANSMITTING/RECEIVING DATA IN A COMMUNICATION SYSTEM

(75) Inventors: Hyun-Jeong Kang, Seoul (KR); Jung-Je Son, Seongnam-si (KR); Hyoung-Kyu Lim, Seoul (KR); Yeong-Moon Son, Anyang-si (KR); Sung-Jin Lee, Suwon-si (KR); Chang-Hoi Koo, Seongnam-si (KR); Pan-Yuh Joo, Seoul (KR); Geun-Ho Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1118 days.

(21) Appl. No.: 11/410,429

(22) Filed: Apr. 25, 2006

(65) Prior Publication Data
US 2006/0239264 A1    Oct. 26, 2006

(30) Foreign Application Priority Data
Apr. 25, 2005   (KR)   ............................... 2005-34254
Apr. 29, 2005   (KR)   ............................... 2005-36436

(51) Int. Cl.
*H04L 12/28* (2006.01)
*H04L 12/26* (2006.01)

(52) U.S. Cl. ...................................... 370/390; 370/252

(58) Field of Classification Search ................. 370/390, 370/252
See application file for complete search history.

(56) References Cited

U.S. PATENT DOCUMENTS 5,953,335 A    9/1999   Erimli et al.
6,072,789 A *  6/2000   Lambertsson ............... 370/338
6,175,902 B1   1/2001   Runaldue et al.
6,185,736 B1 * 2/2001   Ueno ........................... 725/95
6,449,290 B1   9/2002   Willars et al.
6,487,212 B1  11/2002   Erimli et al.
6,667,745 B1  12/2003   Hussain
6,728,820 B1   4/2004   Brian et al.
6,816,929 B2 * 11/2004  Ueda ........................... 710/56
7,620,061 B2 * 11/2009  Yi et al. ....................... 370/432
2003/0157949 A1   8/2003   Sarkkinen et al.
2004/0203620 A1* 10/2004  Thome et al. ............. 455/412.1
2005/0197080 A1*  9/2005  Ulupinar et al. .......... 455/135

(Continued)

FOREIGN PATENT DOCUMENTS

JP    2008-518526    5/2008

(Continued)

OTHER PUBLICATIONS

Duke Dang, IEEE 802.16 Broadband Wireless Access Working Group, Nov. 4, 2004.*

(Continued)

*Primary Examiner*—Derrick W Ferris
*Assistant Examiner*—Angel Brockman
(74) *Attorney, Agent, or Firm*—The Farell Law Firm, LLP

(57) ABSTRACT

Provided is a method for transmitting/receiving data in a communication system providing Multicast/Broadcast Service (MBS). The method includes, generating transmission data to be transmitted to a receiver; allocating the transmission data to a frame; setting a MAP message that includes information on a frame offset related to the frame; and transmitting to the receiver the MAP message.

28 Claims, 6 Drawing Sheets

U.S. PATENT DOCUMENTS

2005/0265250 A1* 12/2005 Gollamudi et al. .......... 370/252
2007/0253367 A1* 11/2007 Dang et al. ................. 370/329

FOREIGN PATENT DOCUMENTS

| RU | 2197779 | 1/2003 |
| RU | 2225675 | 3/2004 |
| WO | WO 99/70786 | 11/2000 |

OTHER PUBLICATIONS

Yeongmoon Son et al., MBS Refinement, IEEE 802.16 Broadband Wireless Access Working Group, May 3, 2005.
Yeongmoon Son et al., MBS Refinement, IEEE 802.16 Broadband Wireless Access Working Group, Apr. 28, 2005.
Part 16: Air Interface for Fixed and Mobile Broadband Wireless Access Systems; Amendment for Physical and Medium Access Control Layers for Combined Fixed and Mobile Operation in Licensed Bands; IEEE WirelessMan 802.16; Apr. 7, 2005.
Jung Je Son et al., MBS Clarification, IEEE 802.16 Broadband Wireless Access Working Group, Nov. 4, 2004.
Jung Je Son et al., MBS Correction, IEEE 802.16 Broadband Wireless Access Working Group, Mar. 9, 2005.
OST 42.149-2001, Signaling System No. 7., Mobile Application Part., Message Addressing, Jul. 1, 2001.

* cited by examiner

METHOD FOR TRANSMITTING/RECEIVING DATA IN A COMMUNICATION SYSTEM

This application claims the benefit under 35 U.S.C. §119 (a) of an application entitled "Method for Transmitting/Receiving Data in a Communication System" filed in the Korean Intellectual Property Office on Apr. 25, 2005 and assigned Serial No. 2005-34254, and an application entitled "Method for Transmitting/Receiving Data in a Communication System" filed in the Korean Intellectual Property Office on Apr. 29, 2005 and assigned Serial No. 2005-36436, the entire contents of both of which are incorporated herein by reference.

BACKGROUND OF THE INVENTION

1. Field of the Invention

The present invention relates generally to a communication system, and in particular, to a method for transmitting/receiving data in a communication system providing Multicast and Broadcast Service (MBS).

2. Description of the Related Art

In the next generation communication system, active research is being conducted to provide users with services varying in Quality-of-Service (QoS) and at a high data rate. Particularly, in the current next generation communication system, studies are being carried out to support high-speed services capable of guaranteeing mobility and a QoS in a Broadband Wireless Access (BWA) communication system such as a wireless Local Area Network (LAN) communication system and a wireless Metropolitan Area Network (MAN) communication system. The Institute of Electrical and Electronics Engineers (IEEE) 802.16 communication system is a typical BWA, LAN and MAN communication system.

The IEEE 802.16 communication system employs an Orthogonal Frequency Division Multiplexing (OFDM)/Orthogonal Frequency Division Multiple Access (OFDMA) scheme to support a broadband transmission network for physical channels of the wireless MAN system. The IEEE 802.16 communication system currently takes into account not only fixed elements of a system but also mobile a subscriber stations (SS). An SS having both fixed elements and mobile elements will be referred to as a mobile station (MS).

The BWA communication system provides user with high-speed multimedia communication service, for example, MBS, beyond the voice and packet data communication services provided in the existing communication system. That is, in a communication system providing MBS, a transmitter, for example, a base station (BS), provides broadcast contents to a plurality of receivers, for example, MSs, using a multicast scheme. The multicast scheme refers to a transmission scheme in which one transmitter transmits transmission data to a plurality of receivers. The communication system providing MBS divides its full broadcast service area into a plurality of service areas, and in each of the divided service areas, one or more transmitters transmit MBS data to all receivers located in their service area using the multicast scheme. The receivers located in each service area simultaneously receive the MBS data from their transmitter(s). In the communication system providing a MBS, one transmitter may manage more than one service areas and simultaneously provide the MBS to receivers located in the multiply service areas.

In the communication system providing the MBS, particularly in the IEEE 802.16 communication system, a transmitter transmits MBS data to receivers at the same frame number and the same MBS symbol position at the same time using the same coding scheme. In order to allow a receiver located in a boundary area of each service area to obtain a macro diversity effect through radio frequency combining, the transmitter should define an MBS field (or MBS zone) in a downlink frame and transmit the MBS data through the MBS field. The receiver receives an MBS-MAP message including information on an MBS field that it should receive in the downlink frame, to detect the MBS field, thereby receiving the MBS data transmitted through the MBS field. Herein, the MAP message transmitting downlink resource allocation information is referred to as a downlink-MAP (DL-MAP) message, and the MAP message transmitting uplink resource allocation information is referred to as an uplink-MAP (UL-MAP) message.

If the transmitter transmits downlink resource allocation information and uplink resource allocation information through the DL-MAP message and the UL-MAP message in this way, the receivers decode the DL-MAP message and ILL-MAP message transmitted by the transmitter to detect the allocation position of resources allocated thereto and the control information of the data they should receive. The MSs can transmit/receive data through the downlink and the uplink by detecting the resource allocation position and control information.

FIG. 1 is a diagram illustrating a structure of a downlink frame in a general communication system providing MBS. In FIG. 1, a downlink frame is represented by subchannels and symbols in a time domain and a frequency domain.

Referring to FIG. 1, a downlink frame includes a preamble field 101, DL-MAP fields 103 and 105, an MBS-MAP message field 109, and a plurality of MBS data burst fields, i.e., an MBS data burst 1 field 113, an MBS data burst 2 field 115, and an MBS data burst 3 field 117. Further, the DL-MAP field 103 includes an MBS_MAP_Information Element (MBS_MAP_IE) field 107, and the MBS-MAP message field 109 includes an MBS_Data_Information Element (MBS_Data_IE) field 111.

The preamble field 101 transmits a synchronization signal, i.e., a preamble sequence, for synchronization acquisition between a transmitter and a receiver. The DL-MAP fields 103 and 105, fields for transmitting DL-MAP information, include the MBS_MAP_IE field 107 to provide MBS, and an MBS_MAP_IE included in the MBS_MAP_IE field 107 provides information for decoding the MBS-MAP message field 109. A format of the MBS_MAP_IE included in the MBS_MAP_IE field 107 is shown in Table 1 below.

TABLE 1

| Syntax | Size (bits) | Notes |
|---|---|---|
| MBS_MAP_IE( ) { | | |
| Extended DIUC | 4 | MBS_MAP=0x0A |
| Length | 4 | |
| MBS Zone Identifier | 7 | MBS Zone identifier corresponds to the identifier provided by the BS at connection initiation |

TABLE 1-continued

| Syntax | Size (bits) | Notes |
| --- | --- | --- |
| Macro diversity enhanced | 1 | 0=Non Macro diversity enhanced zone<br>1=Macro diversity enhanced zone |
| If(Macro diversity enhanced=1) { | | |
| Permutation | 2 | 0b00=PUSC permutation<br>0b01=FUSC permutation<br>0b10=Optional FUSC permutation<br>0b11=Adjacent subcarrier permutation |
| IDcell | 6 | |
| } | | |
| OFDMA symbol offset | 7 | OFDMA symbol offset with respect to start of the MBS region |
| DIUC change indication | 1 | Used to indicate DIUC change is included |
| If(DIUC change indication=1) { | | |
|   Reserved | 1 | |
|   Boosting | 3 | |
|   DIUC | 4 | |
|   No. subchannels | 6 | |
|   No. OFDMA symbols | 2 | |
|   Repetition coding indication | 2 | 0b00=No repetition coding<br>0b01=repetition coding of 2 used<br>0b10=repetition coding of 4 used<br>0b11=repetition coding of 6 used |
| } else { | | |
|   DIUC | 4 | |
|   CID | 12 | 12 LSB of CID |
| OFDMA symbol offset | 8 | The offset of the OFDMA symbol in which the burst starts, measured in OFDMA symbols from beginning of the downlink frame in which the DL-MAP is transmitted. |
|   Subchannel offset | 6 | The lowest index OFDMA subchannel used for carrying the burst, starting from subchannel 0. |
|   Boosting | 3 | |
|   SLC_3_Indication | 1 | Used to notify sleep mode class 3 is used for single BS MBS service |
|   No. OFDMA symbols | 6 | |
|   No. subchannels | 6 | |
|   Repetition coding indication | 2 | 0b00=No repetition coding<br>0b01=Repetition coding of 2 used<br>0b10=Repetition coding of 4 used<br>0b11=Repetition coding of 6 used |
| If(SLC_3_Indication=0) { | | |
|   Next MBS frame offset | 8 | The Next MBS frame offset value is lower 8bits of the frame number in which the BS shall transmit the next MBS frame. |
|   Next MBS OFDMA symbol offset | 8 | The offset of the OFDMA symbol in which the next MBS zone starts, measured in OFDMA symbols from the beginning of the downlink frame in which the MBS-MAP is transmitted. |
|   } | | |
| } | | |
| If!(byte boundary) { | | |
|   Padding nibble | Variable | Padding to reach byte boundary |
| } | | |
| } | | |

Table 1 shows Information Elements (IEs) of the MBS_MAP_IE included in the MBS_MAP_IE field 107. In Table 1, 'Extended Downlink Interval Usage Code (Extended DIUC)' indicates that the MBS_MAP_IE includes MBS-MAP information, and is set to have a value of '0x0A'. 'MBS Zone Identifier' indicates an identifier of the MBS field, 'Macro Diversity Enhanced' indicates whether macro diversity is applied to the MBS field, and 'Permutation' and 'IDcell' indicate information necessary when the macro diversity is applied to the MBS zone. Herein, the MBS field includes the MBS-MAP message field 109 having the MBS_Data_IE field 111, and a plurality of MBS data burst fields 113, 115 and 117.

In addition, 'OFDMA symbol offset' indicates a start offset of an MBS-MAP message in the MBS field, 'DIUC change indication' indicates a change in DIUC to be used for receiving the MBS-MAP message, and 'No. Subchannels' indicates the number of allocated subchannels. Further, 'No. OFDMA Symbols' indicates the number of allocated OFDMA symbols, and 'Repetition coding indication' indicates coding information to be used for decoding the MBS-MAP message. The IEs not mentioned in Table 1 are not directly related to the present invention, so a detailed description thereof will be omitted herein.

As shown in Table 1, the MBS_MAP_IE field 107 includes information on the MBS-MAP message field 109, and receivers receive the MBS-MAP message transmitted with the MBS-MAP message field 109 through the MBS_MAP_IE. With reference to Table 2, a detailed description will now be made of the MBS-MAP message. Table 2 below shows a format of the MBS-MAP message.

TABLE 2

| Syntax | Size (bits) | Notes |
|---|---|---|
| MBS-MAP Message format ( ) { | | |
|     MAC Generic Header | 48 | 6bytes |
|     Management message type=62 | 4 | |
|     Frame number | 4 | The frame number is identical to the frame number in the DL-MAP |
|     MBS_DIUC_Change_Count | 8 | |
|     # MBS_DATA_IE | 4 | Number of included MBS_DATA_IE |
|     For(i=0;i<n; i++) { | | N= #MBS_DATA_IE |
|       MBS_DATA_IE | Variable | |
|     } | | |
|     #MBS_DATA_Time_Diversity_IE | 4 | Number of included MBS_DATA_Time_Diversity_IE |
|     For(i=0;i<m; i++) { | | m= #MBS_DATA_Time_Diversity_IE |
|   MBS_DATA_Time_Diversity_IE | Variable | |
|     } | | |
|     If(!byte boundary) { | | |
|     Padding nibble | 8 | |
|   } | | |
|     TLV encoding element | | |
| } | | |

Table 2 shows a format of the MBS-MAP message transmitted through the MBS-MAP message field 109. The MBS-MAP message includes a 6-byte or 48-bit Medium Access Control (MAC) Generic Header, and a plurality of IEs. Of the IEs, 'Management Message Type' indicates a type of a management message, 'Frame number' indicates the same frame number as a frame number of the DL-MAP, and 'MBS DIUC Change Count' indicates whether the MBS data burst profile is identical to a previous MBS data burst profile.

If a value of the 'MBS DIUC Change Count' is changed, the receiver that received the MBS-MAP message should receive downlink burst profile information included as Time/Length/Value (TLV) information of the MBS-MAP message. However, if the downlink burst profile information is not included in the MBS-MAP message, the receiver receives the downlink burst profile information through a next Downlink Channel Descriptor (DCD) message. In addition, 'MBS_Data_IE' and 'MBS_Data_Time_Diversity_Information Element' (MBS_Data_Time_Diversity_IE) indicate field information of MBS data bursts that the receiver will receive. The 'MBS_Data_Time_Diversity_IE' includes information on MBS data bursts allocated when there is only the MBS burst data for a receiver supporting a Hybrid Automatic Repeat reQuest (HARQ) scheme. The IEs not mentioned in Table 2 are not directly related to the present invention, so a detailed description thereof will be omitted herein.

With reference to Table 3, a description will now be made of the MBS_Data_IE including information on the MBS data burst fields 113, 115 and 117 over which MBS data is transmitted.

TABLE 3

| Syntax | Size (bits) | Notes |
|---|---|---|
| MBS_DATA_IE { | | |
| MBS_MAP_Type=0 | 4 | MBS_DATA_IE |
| Next MBS MAP change indication | 1 | This indicates whether the size of MBS MAP message of next MBS frame for these multicast CIDs included this IE will be different from the size of this MBS MAP message. |
| No. of Multicast CID | 3 | |
| For(i=0;i<No. of Multicast CIDs; i++) { | | |
|   Multicast CID | 12 | 12 LSBs of CID for multicast |
| } | | |
| MBS DIUC | 4 | |
| OFDMA symbol offset | 8 | OFDMA symbol offset with respect to start of the MBS portion |
| Subchannel offset | 6 | OFDMA subchannel offset with respect to start of the MBS portion |
| Boosting | 3 | |
| No. OFDMA symbols | 7 | The size of MBS data |
| No. subchannels | 6 | |
|   Repetition coding indication | 2 | 0b00=No repetition coding<br>0b01=Repetition coding of 2 used<br>0b10=Repetition coding of 4 used<br>0b11=Repetition coding of 6 used |
| Next MBS frame offset | 8 | The Next MBS frame offset value is lower 8 bits of the frame number in which the BS shall transmit the next MBS frame. |
| Next MBS OFDMA symbol offset | 8 | The offset of the OFDMA symbol in which the next MBS portion starts, measured in OFDMA symbols |

TABLE 3-continued

| Syntax | Size (bits) | Notes |
|---|---|---|
| | | from beginning of the downlink frame in which the MBS-MAP is transmitted. |
| If(Next MBS MAP change indication=1) { | | |
|    Next MBS No. OFDMA symbols | 2 | It is to indicate the size of MBS_MAP message in Next MBS portion where the BS shall transmit the next MBS frame for multicast CIDs in this IE. |
|    Next MBS No. OFDMA symbols | 6 | It is to indicate the size of MBS_MAP message in Next MBS portion where the BS shall transmit the next MBS frame for multicast CIDs in this IE. |
|    } | | |
| } | | |

Table 3 shows IEs of the MBS_Data_IE transmitted through the MBS_Data_IE field 111. In Table 3, 'MBS_MAP_Type' indicates that the IEs of Table 3 are MBS_Data_IE, and 'Next MBS MAP change indication' indicates a change in size of an MBS-MAP message that will come in the next MBS frame, wherein the MBS frame means the frame that includes information of the MBS data or the data burst of the MBS. In addition, 'Multicast Connection Identifier (CID)' indicates multicast identifier information mapped to the MBS_Data_IE, 'OFDMA Symbol Offset' and 'Subchannel Offset' indicate start offsets of the MBS data burst fields 113, 115 and 117, and 'No. Subchannels' indicates the number of subchannels of the MBS data burst fields 113, 115 and 117 allocated to the MBS frame. Further, 'No. OFDMA Symbols' indicates the number of OFDMA symbols of the allocated MBS data burst fields 113, 115 and 117, and 'Repetition coding indication' indicates the number of repetitions (or iterations) needed for decoding the MBS data transmitted through the MBS data burst fields 113, 115 and 117.

In addition, 'Next MBS frame offset' indicates an offset of the next MBS frame, and 'Next MBS OFDMA symbol offset' indicates an offset of a downlink frame OFDMA symbol for receiving the next MBS-MAP message. Herein, if the 'Next MBS MAP change indication' is set to '1', it means that the 'Next MBS OFDMA symbol offset' includes 'Next MBS No. OFDMA symbols' indicating a size of an MBS-MAP message that will come in the next MBS frame, and 'Next MBS No. OFDMA subchannels'. After receiving the 'Next MBS frame offset' and the 'Next MBS OFDMA symbol offset', the receiver can obtain the MBS service information without receiving the MBS_MAP_IE of the DL-MAP. The IEs not mentioned in Table 3 are not directly related to the present invention, so a detailed description thereof will be omitted herein.

The foregoing MBS-MAP message serves as a MAC control message including information so that the receiver can decode the MBS data burst fields and the corresponding MBS data in MBS data transmitted through the fields. As a result, the MBS-MAP message shown in Table 2 provides information on the MBS data burst fields to the receivers, along with 48-bit MAC Generic Header, as described above. If the amount of information on the MBS data burst fields in which the MBS-MAP message is to be included is large, the MBS-MAP message may not include information on many MBS data burst fields that should be included in one MBS frame, because of the 48-bit MAC Generic Header. Accordingly, the MBS-MAP message is not fully transmitted in one MBS frame, and is transmitted in the next MBS frame, along with the MAC Generic Header.

As the MBS-MAP message is transmitted over two MBS frames together with the MAC Generic Header, the MAC Generic Header becomes an overhead. In addition, the transmitter transmits the MBS-MAP message over two MBS frames due to the 48-bit MAC Generic Header even for the information on the MBS data burst fields that can be transmitted in one MBS frame, thereby causing a waste of frequency bands. In order to prevent the waste of the frequency bands, it is also possible to allocate information on some of the MBS data burst fields to the current MBS frame before transmission, and transmit information on the other MBS data burst fields in the next MBS frame. In this case, there is a need for a scheme for additionally transmitting information indicating to which MBS frame the information on the MBS data burst fields included in the MBS-MAP message transmitted in the current MBS frame is allocated before being transmitted.

FIG. 2 is a diagram schematically illustrating a structure of an MBS frame in a general communication system providing MBS. In FIG. 2, an MBS-MAP message and information on MBS data burst fields included in the MBS-MAP message are transmitted over two frames of a particular frame n and the next frame (n+1). For convenience, FIG. 2 illustrates only the MBS field in the downlink MBS frame of FIG. 1.

Referring to FIG. 2, an MBS frame n 200 includes an MBS-MAP message field 201, and a plurality of MBS data burst fields that include an MBS data burst 1 field 211, an MBS data burst 2 field 213 and an MBS data burst 3 field 215. The MBS-MAP message field 201 includes a plurality of an MBS_Data_IE fields 203, 205, 207 and 209 each including MBS data burst field information. In addition, an MBS frame (n+1) 250, the next frame of the MBS frame n 200, includes an MBS-MAP message field 251, and a plurality of MBS data burst fields that include an MBS data burst 4 field 255 and an MBS data burst 5 field 257. The MBS-MAP message field 251 includes an MBS_Data_IE 253 including the MBS data burst field information. The MBS_Data_IEs transmitted through the MBS_Data_IE fields 203, 205, 207 and 209 included in the MBS-MAP message field 201 of the MBS frame n 200 include information on the MBS data burst fields 211, 213, 215 and 255. In addition, the MBS_Data_IE transmitted through the MBS_Data_IE field 253 included in the MBS-MAP message field 251 of the MBS frame (n+1) 250 includes information on the MBS data burst fields 257.

Because the MBS data burst fields 211, 213, 215 and 255 mapped to the MBS_Data_IE transmitted through the MBS_Data_IE fields 203, 205, 207 and 209 included in the MBS-MAP message field 201 of the MBS frame n 200 cannot be wholly allocated to one MBS frame, i.e., the MBS frame n 200, the receiver cannot fully receive the MBS data transmitted through the MBS data burst fields 211, 213, 215 and 255. Accordingly, the MBS data burst 1 field 211, the MBS data burst 2 field 213 and the MBS data burst 3 field 215 among the MBS data burst fields 211, 213, 215 and 255 are allocated to the MBS frame n 200, so that the receiver receives MBS data transmitted through the MBS data burst 1 field 211, the MBS data burst 2 field 213 and the MBS data burst 3 field 215 in the MBS frame n 200. In addition, the MBS data burst 4 field 255 among the MBS data burst fields 211, 213, 215 and 255 is allocated to the MBS frame (n+1) 250, so that the receiver receives MBS data transmitted through the MBS data burst 4 field 255 in the MBS frame (n+1) 250.

At this moment, the receiver cannot determine whether the transmitter has allocated the MBS data bursts 211, 213, 215 and 255 mapped to the MBS-MAP message field 201 of the MBS frame n 200 in the current MBS frame, i.e., the MBS frame n 200, or in the next MBS frame, i.e., the MBS frame (n+1) 250. Therefore, upon receiving the MBS frame n 200, the receiver decodes the MBS data of the MBS data burst 1 field 211, MBS data of the MBS data burst 2 field 213, and MBS data of the MBS data burst 3 field 215 received in the MBS frame n 200, using the MBS_Data_IE included in the MBS_Data_IE fields 203, 205 and 207 of the MBS-MAP message field 201. In addition, upon receiving the next MBS frame, i.e., the MBS frame (n+1) 250, the receiver decodes the MBS data of the MBS data burst 5 field 257 received in the MBS frame (n+1) 250 using the MBS_Data_IE included in the MBS_Data_IE field 253 of the MBS-MAP message field 251.

FIG. 2 illustrates operations 221, 223, 255 and 271 of decoding the MBS data transmitted through the MBS data burst fields 211, 213, 215 and 257, using the MBS_Data_IE in each frame. As described with reference to FIG. 2, in the MBS frame n 200, information on the MBS data burst fields included in the MBS-MAP message field 201 is information on the MBS data burst 1 field 211, the MBS data burst 2 field 213, the MBS data burst 3 field 215 and the MBS data burst 4 field 255. Although the information on the MBS data burst fields 211, 213, 215 and 255 is allocated to the MBS frame n 200 in this manner, the MBS data burst 4 field 255 is actually allocated to the MBS frame (n+1) 250.

However, the receiver receiving the MBS frame n 200 cannot determine that the transmitter has allocated the MBS data burst fields 211, 213, 215 and 255 as described above, using the MBS-MAP message and the MBS_Data_IE having the structures of Table 2 and Table 3, transmitted through the MBS-MAP message field 201 and the MBS_Data_IE fields 203, 205, 207 and 209 of the MBS frame n 200. Therefore, upon receiving the MBS frame n 200, i.e., the current MBS frame, the receiver performs an operation 227 of decoding the MBS data transmitted through the MBS data burst 4 field 255, considering that the MBS data burst 4 field 255 is allocated to the current MBS frame. However, because the MBS data burst 4 field 255 is not allocated to the MBS frame n 200, an error may occur in the receiver.

In addition, the receiver, receiving the MBS-MAP message with the MBS_Data_IE in a particular MBS frame, may not decode the MBS data transmitted through the MBS data burst fields mapped to the MBS_Data_IE in the particular MBS frame in a real time. That is, even though the transmitter has transmitted the MBS data through the MBS_Data_IE and the MBS data burst fields including allocation and decoding information of the MBS data burst fields in the particular MBS frame, the receiver may fail to decode the MBS data transmitted through the MBS data burst fields due to its processing delay.

Therefore, because the MBS data burst fields individually mapped to the MBS data burst fields included in the MBS_Data_IE of the MBS-MAP message should be allocated to the same MBS frame as the MBS-MAP message field through which the MBS-MAP message is transmitted, there is a need for a scheme for reducing a size of the MBS-MAP message. In addition, there is a demand for a scheme for reducing a processing error which may occur when the receiver recognizes an MBS frame to which the MBS data burst fields are allocated, and decodes the MBS data transmitted through the MBS data burst fields. Further, there is a need for a scheme in which the transmitter provides the receiver with information used for previously decoding the MBS data before a transmission time of the MBS data through the MBS data burst fields, and an allocation time of the MBS data burst fields through which the MBS data is transmitted, i.e., a transmission time of the MBS data, thereby preventing the processing delay of the receiver.

SUMMARY OF THE INVENTION

It is, therefore, an object of the present invention to provide a method for transmitting/receiving data in a communication system.

It is another object of the present invention to provide a data transmission/reception method for preventing processing delay and misoperation of the system by previously transmitting/receiving data transmission information before a data transmission time in a communication system.

It is further another object of the present invention to provide a data transmission/reception method in a communication system providing MBS.

According to one aspect of the present invention, there is provided a method for transmitting data in a communication system. The method includes, generating transmission data to be transmitted to a receiver; allocating the transmission data to a frame; setting a MAP message that includes information on a frame offset related to the frame; and transmitting to the receiver the MAP message.

According to another aspect of the present invention, there is provided a method for transmitting data in a communication system. The method includes, upon generation of data to be transmitted to a receiver, determining a transmission field of the generated data, and allocating the determined transmission field to a frame; setting in transmission field information location information of the transmission field allocated to the frame and frame offset information defining an offset between the frame to which the transmission field is allocated and a reference frame; and transmitting to the receiver a MAP message including the set transmission field information.

According to another aspect of the present invention, there is provided a method for transmitting data in a communication system. The method includes, upon generation of data to be transmitted to a receiver, determining a transmission field of the generated data; determining offset of frame including the transmission field; setting in data information offset information defining the offset of frame and location information of the transmission field according to the offset information; and transmitting to the receiver a MAP message including the set data information.

According to another aspect of the present invention, there is provided a method for transmitting multicast broadcast service (MBS) data of a base station (BS) in a broadband wireless access (BWA) communication system. The method includes, determining a frame offset of MBS data burst, a frame comprising the MBS data burst is the n-th frame following the current frame comprising the frame offset; determining a position of the MBS data burst within the n-th frame; setting information of the frame offset and the position in a message; and transmitting the message to a mobile station.

According to further another aspect of the present invention, there is provided a method for receiving data in a communication system. The method includes receiving a MAP message that includes information on a frame offset related to a data burst before receiving the data burst from a transmitter; analyzing the information on the frame offset; and receiving from the transmitter the data burst within the n-th frame flowing a frame comprising the MAP message according to the analysis of the information.

According to yet another aspect of the present invention, there is provided a method for receiving data in a communication system. The method includes upon receiving a MAP message before receiving data from a transmitter, analyzing location information of a data burst included in the MAP message and frame offset information defining an offset between a frame to which the data burst is allocated and a current frame; and receiving the data burst within the frame according to the analyzed location information and the frame offset information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Preferred embodiments of the present invention will now be described in detail with reference to the annexed drawings. In the following description, a detailed description of known functions and configurations incorporated herein has been omitted for clarity and conciseness.

The present invention proposes a method for transmitting/receiving data in an communication system, for example, Institute of Electrical and Electronics Engineers (IEEE) 802.16 communication system which is a typical Broadband Wireless Access (BWA) communication system. Although the present invention will be described below with reference to an IEEE 802.16 communication system employing an Orthogonal Frequency Division Multiplexing (OFDM)/Orthogonal Frequency Division Multiple Access (OFDMA) scheme, the data transmission method proposed in the present invention can also be applied to other communication systems.

In addition, the present invention proposes a data transmission/reception method between a transmitter, for example, a base station (BS), for managing a service area and a receiver, for example, a mobile station (MS), for receiving communication service from the transmitter in a communication system, wherein the MS is both fixed and mobile. The present invention proposes a method in which a transmitter transmits Multicast and Broadcast Service (MBS) data to a plurality of receivers located in its coverage area and the receivers receive the transmitted MBS data in a communication system providing MBS.

Figure 1:
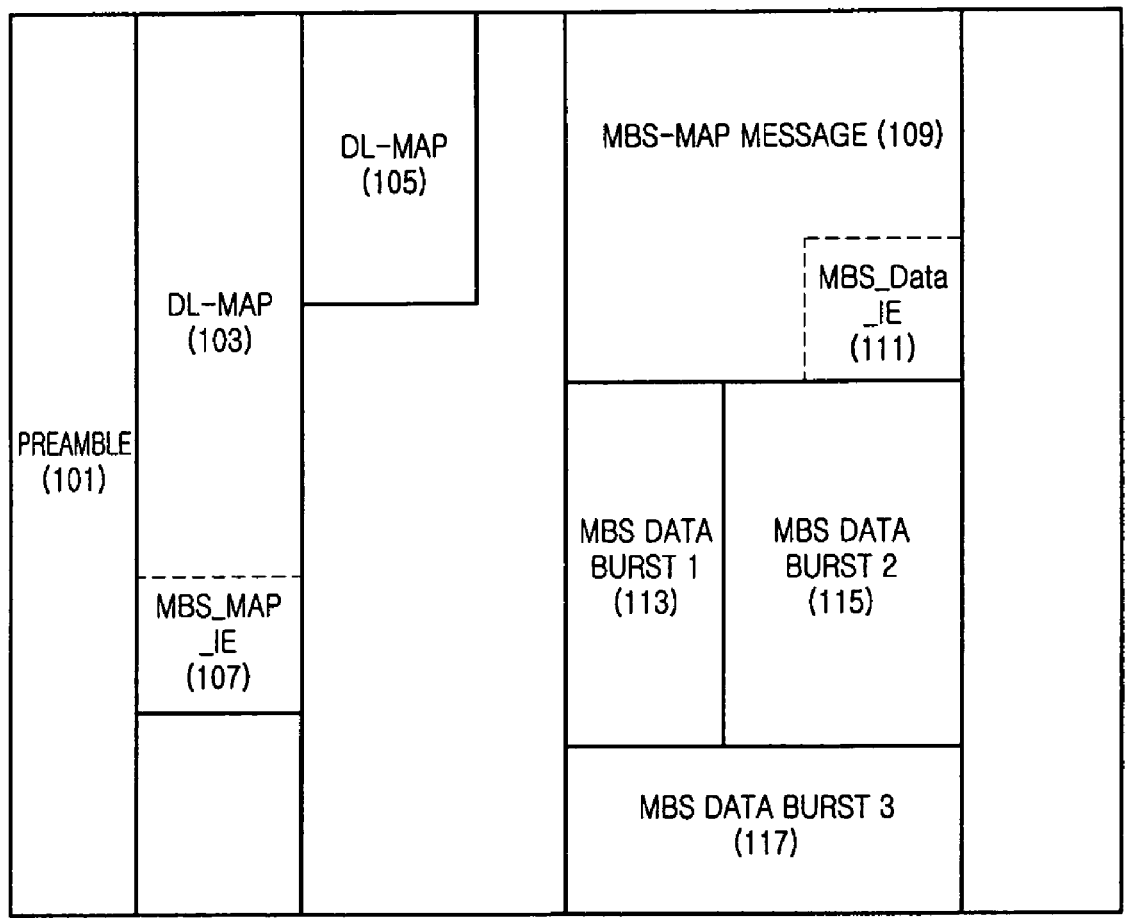
FIG. 1 is a diagram illustrating a structure of a downlink frame in a general communication system providing MBS.
Figure 2:
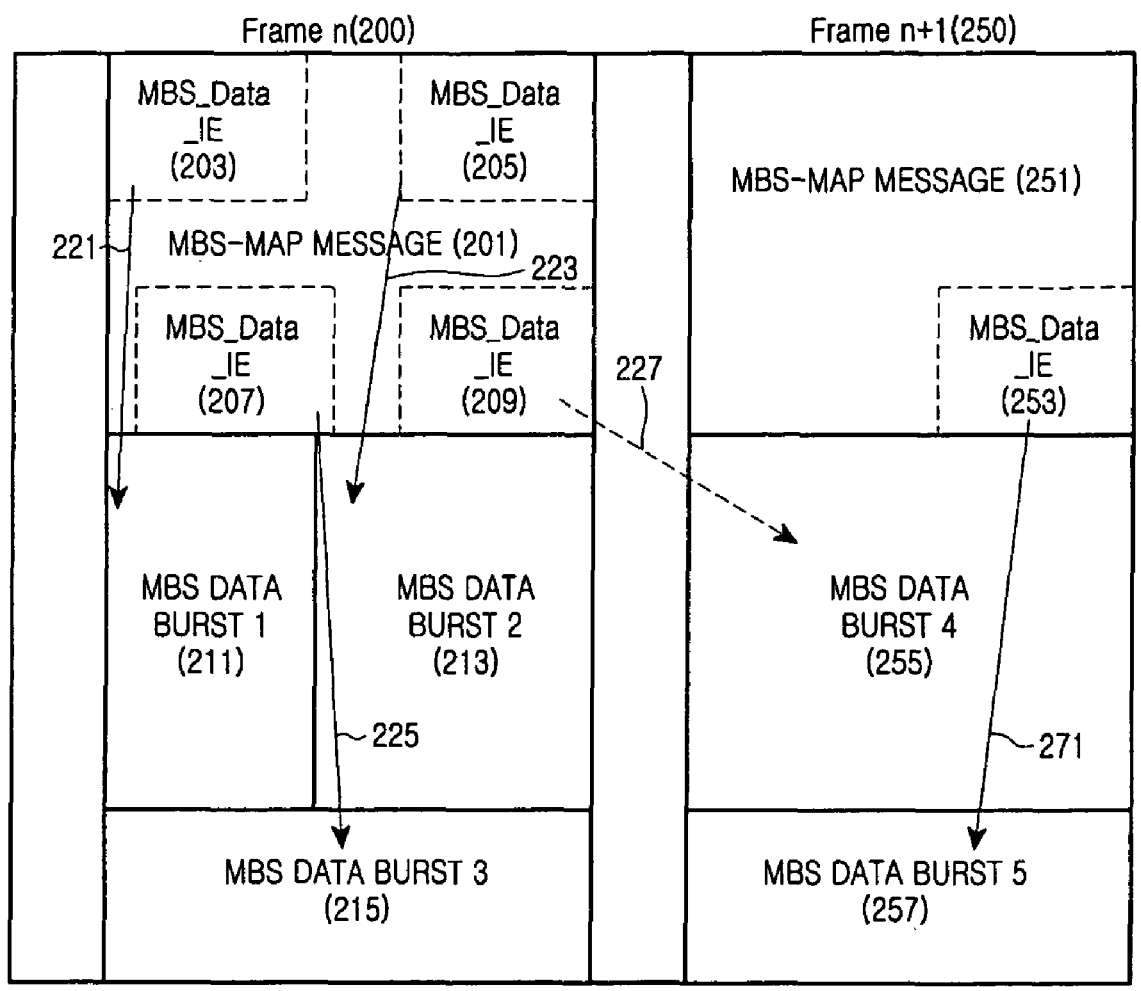
FIG. 2 is a diagram illustrating a structure of an MBS frame in a general communication system providing MBS.

Further, the present invention proposes a method in which a transmitter previously transmits information related to transmission data to a receiver before a data transmission time before transmitting data in a communication system. Herein, the "information related to transmission data" can include information about a frame in which the data is transmitted, information about a data transmission field allocated for data transmission in the frame, and decoding information for the data. The present invention will be described herein based on the communication system providing the MBS. In the communication system providing the MBS, a downlink MBS frame can be represented with subchannels and symbols in a time domain and a frequency domain as described with reference to FIG. 1, wherein the MBS frame means the frame that includes information of the MBS data or the data burst of the MBS. In addition, the downlink MBS frame includes a preamble field, a DL-MAP field, an MBS-MAP message field, and a plurality of MBS data burst fields. Further, the DL-MAP field includes an MBS_MAP_Information Element (MBS_MAP_IE) field, and the MBS-MAP message field includes an MBS_Data_Information Element (MBS_Data_IE) field.

The preamble field transmits a synchronization signal, i.e., a preamble sequence, for synchronization acquisition between a transmitter and a receiver. The DL-MAP field, a field for transmitting DL-MAP information, includes the MBS_MAP_IE field to provide MBS, and an MBS_MAP_IE included in the MBS_MAP_IE field provides information for decoding the MBS-MAP message field. A format of the MBS_MAP_IE included in the MBS_MAP_IE field is shown in Table 1. As shown in Table 1, 'Extended Downlink Interval Usage Code (Extended DIUC)' of the MBS_MAP_IE indicates that the MBS_MAP_IE includes MBS-MAP information, and is set to have a value of '0x0A'. 'MBS Zone Identifier' indicates an identifier of the MBS field, 'Macro Diversity Enhanced' indicates whether macro diversity is applied to the MBS field (or MBS zone), and 'Permutation' and 'IDcell' indicate information necessary when the macro diversity is applied to the MBS zone. Herein, the MBS field includes the MBS-MAP message field having the MBS_Data_IE field, and a plurality of MBS data burst fields in FIG. 1.

In addition, 'OFDMA symbol offset' indicates a start offset of an MBS-MAP message in the MBS field, 'DIUC change indication' indicates a change in DIUC to be used for receiving the MBS-MAP message, and 'No. Subchannels' indicates the number of allocated subchannels. Further, 'No. OFDMA Symbols' indicates the number of allocated OFDMA symbols, and 'Repetition coding indication' indicates coding information to be used for decoding the MBS-MAP message.

The present invention reduces an overhead due to the MBS-MAP message that a receiver desiring to receive MBS data from a transmitter receives in a communication system providing MBS, allowing the receiver to transmit the MBS-MAP message within one MBS frame. The present invention proposes a method in which when decoding MBS data using information on MBS data burst fields in which MBS data included in the MBS-MAP message is transmitted, a receiver receives MBS data using either information on the MBS-MAP message transmitted over the current MBS frame, or information on the MBS-MAP message transmitted over a previous MBS frame. In this method, the receiver receives MBS data actually transmitted through the MBS data burst fields, and recognizes a processing time of the MBS data, i.e., a decoding time of the MBS data, using the 'MBS_Burst_Frame_Offset' included in the MBS_Data_IE and the MBS_Data_Time_Diversity_Information Element (MBS_Data_Time_Diversity_IE) of the MBS-MAP message. Herein, the MBS_Data_IE and the MBS_Data_Time_Diversity_IE indicate field information of the MBS data bursts the receiver will receive. The receiver receives the MBS data transmitted through the MBS data burst fields allocated to the MBS frame at the recognized time according to the recognized information, and processes the received MBS data.

A detailed description will now be made of an MBS-MAP message transmitted through the MBS-MAP message field of the MBS frame and a MBS_Data_IE transmitted through a MBS_Data_IE field included in the MBS-MAP message field in the communication system providing MBS according to the present invention.

Table 4 below shows the format of the MBS-MAP message transmitted through the MBS-MAP message field of the MBS frame in the communication system providing MBS according to the present invention.

Significant Bit (MSB) bits, i.e., first and second MSB bits, of the MBS MAP indicator, indicate information mapped to a Header Type (HT) field and an Encryption (EC) field of the MAC header. A value of the HT field, the first MSB bit of the MBS MAP indicator, indicates whether the MBS-MAP message transmits a general MAC PDU or a bandwidth request message, and the EC field, the second MSB bit of the MBS MAP indicator, indicates whether encryption is applied to the currently transmitted frame. A third MSB bit of the MBS MAP indicator indicates whether the corresponding MAP is a compressed MAP, and the third MSB bit of the MBS MAP indicator being set to '0' indicates a compressed MAP. The last two bits, i.e., fourth and fifth MSB bits, of the MBS MAP indicator indicate that the corresponding MAP is a Sub DownLink UpLink MAP (Sub-DL-UL-MAP). Herein, the fourth and fifth MSB bits of the MBS MAP indicator being set to '00' indicates that the next information is a Sub-DL-UL-MAP, and if the fourth and fifth MSB bits of the MBS MAP indicator are set to '01', it indicates that the next information is a MBS-MAP message. The compressed MAP and the Sub-DL-UL-MAP are not related to the present invention, so a detailed description thereof will be omitted herein.

That is, a transmitter desiring to transmit the MBS-MAP message to the receiver sets the first and second MSB bits of the MBS MAP indicator to '11', and sets the third MSB bit to '1' to indicate a non-compressed MAP. Further, the transmitter sets the fourth and fifth MSB bits of the MBS MAP indicator to '01' to indicate an MBS-MAP message. As a

TABLE 4

| Syntax | Size(bits) | Notes |
|---|---|---|
| MBS-MAP Message format ( ) { | | |
|     MBS MAP indicator | 5 | Shall be set to 11101 |
|     Reserved | 3 | Shall be set to 0 |
|     Frame number | 4 | The frame number is identical to the frame number in the DL-MAP |
|     MBS_DIUC_Change_Count | 8 | |
|     #MBS_DATA_IE | 4 | Number of included MBS_DATA_IE |
|     For(i=0;i<n; i++) { | | n= #MBS_DATA_IE |
|       MBS_DATA_IE | variable | |
|     } | | |
|     #MBS_DATA_Time_Diversity_IE | 4 | Number of included MBS_DATA_Time_Diversity_IE |
|     For(i=0;i<m; i++) { | | m= #MBS_DATA_Time_Diversity_IE |
| MBS_DATA_Time_Diversity_IE | variable | |
|     } | | |
|     If(!byte boundary) { | | |
|     Padding nibble | 8 | |
|     } | | |
|     TLV encoding element | | |
| } | | |

Although Table 4, showing the format of the MBS-MAP message transmitted through the MBS-MAP message field of the MBS frame, provides the information similar to that of the MBS-MAP message of Table 2, the MBS-MAP message of Table 4 does not include the 48-bit Medium Access Control (MAC) Generic Header of Table 2. That is, in the communication system providing MBS according to the present invention, the MBS-MAP message uses a format of an independently provided MAC header without transmitting the 48-bit MAC Generic Header to the receiver.

With reference to Table 4, a detailed description will now be made of the MBS-MAP message in the communication system providing MBS according to the present invention. The MBS-MAP message includes an MBS MAP indicator. The MBS MAP indicator has a value '11101', and two Most result, the transmitter sets the MBS MAP indicator of the MBS-MAP message to '11101'. Thereafter, the transmitter transmits the MBS MAP indicator to the receiver through the MBS-MAP message field of the MBS frame, and the receiver, receiving the set MBS MAP indicator of the MBS-MAP message through the MBS-MAP message field of the MBS frame, recognizes that the received information is an MBS-MAP message if the five bits of the MBS MAP indicator are set to '11101'.

Thereafter, the receiver performs decoding on the recognized MBS-MAP message, and decodes MBS data transmitted through MBS data burst fields of the MBS frame using information on the MBS data burst fields included in the MBS-MAP message. In addition, 'Frame number' of the MBS-MAP message indicates the same frame number as a frame number of the DL-MAP, and 'MBS DIUC Change Count' indicates whether the MBS data burst profile is identical to a previous MBS data burst profile.

If a value of the 'MBS DIUC Change Count' is changed, the receiver receiving the MBS-MAP message should receive downlink burst profile information included as Time/Length/Value (TLV) information of the MBS-MAP message. However, if the downlink burst profile information is not included in the MBS-MAP message, the receiver receives the downlink burst profile information through a next Downlink Channel Descriptor (DCD) message. In addition, 'MBS_Data_IE' and 'MBS_Data_Time_Diversity_Information Element' (MBS_Data_Time_Diversity_IE) indicate field information of MBS data bursts the receiver will receive. The MBS_Data_Time_Diversity_IE includes information on MBS data bursts allocated when there is only the MBS burst data for a receiver supporting a Hybrid Automatic Repeat reQuest (HARQ) scheme. The IEs not mentioned in Table 4 are not directly related to the present invention, so a detailed description thereof will be omitted herein.

With reference to Table 5, a description will now be made of the MBS_Data_IE including information on the MBS data burst fields in which MBS data is transmitted.

included in the MBS-MAP message, and includes information on the MBS data transmitted from the transmitter to the receiver through the MBS data burst fields of the MBS frame. 'MBS_MAP_Type' of the MBS_Data_IE indicates that the IEs of Table 5 are MBS_Data_IE, and 'Next MBS MAP change indication' indicates a change in size of an MBS-MAP message that will come in the next MBS frame. In addition, the MBS_Data_IE transmits information indicating whether the MBS data corresponds to the same MBS frame as the MBS frame in which an MBS-MAP message is currently received, or corresponds to an MBS frame in which the next MBS-MAP will be received, using a Next MBS frame indicator.

In other words, if the Next MBS frame indicator of the MBS_Data_IE is set to '0', the receiver processes, or decodes the MBS data transmitted through the MBS data burst fields in the current MBS frame, recognizing that the information included in the MBS_Data_IE transmitted through the current MBS frame is MBS data will be processed in the current MBS frame. However, if the Next MBS frame indicator is set to '1', the receiver processes, or decodes the MBS data transmitted through the MBS data burst fields in the next MBS frame, recognizing that the information included in the MBS_

TABLE 5

| Syntax | Size (bits) | Notes |
| --- | --- | --- |
| MBS_DATA_IE { | | |
| MBS_MAP_Type=0 | 3 | MBS_DATA_IE |
| Next MBS frame indicator | 1 | 0=MBS data burst of the current MBS frame<br>1=MBS data burst of the next MBS frame |
| Next MBS MAP change indication | 1 | This indicates whether the size of MBS MAP message of next MBS frame for these multicast CIDs included this IE will be different from the size of this MBS MAP message. |
| No. of Multicast CID | 3 | |
| For(i=o; i<No. of Multicast CIDs; i++) { | | |
|     Multicast CID | 12 | 12 LSBs of CID for multicast |
| } | | |
| MBS DIUC | 4 | |
| OFDMA symbol offset | 8 | OFDMA symbol offset with respect to start of the MBS portion |
| Subchannel offset | 6 | OFDMA subchannel offset with respect to start of the MBS portion |
| Boosting | 3 | |
| No. OFDMA symbols | 7 | The size of MBS data |
| No. subchannels | 6 | |
| Repetition coding indication | 2 | 0b00=No repetition coding<br>0b01=Repetition coding of 2 used<br>0b10=Repetition coding of 4 used<br>0b11=Repetition coding of 6 used |
| Next MBS frame offset | 8 | The Next MBS frame offset value is lower 8 bits of the frame number in which the BS shall transmit the next MBS frame. |
| Next MBS OFDMA symbol offset | 8 | The offset of the OFDMA symbol in which the next MBS portion starts, measured in OFDMA symbols from the beginning of the downlink frame in which the MBS-MAP is transmitted. |
| If(Next MBS MAP change indication=1) { | | |
|   Next MBS No. OFDMA symbols | 2 | It is to indicate the size of MBS_MAP message in Next MBS portion where the BS shall transmit the next MBS frame for multicast CIDs in this IE. |
|   Next MBS No. OFDMA subchannels | 6 | It is to indicate the size of MBS_MAP message in Next MBS portion where the BS shall transmit the next MBS frame for multicast CIDs in this IE. |
| } | | |
| } | | |

Table 5 shows IEs of the MBS_Data_IE transmitted through the MBS_Data_IE field. The MBS_Data_IE is Data_IE transmitted through the current MBS frame will be processed in the next MBS frame. In this manner, the receiver receives the MBS data. If the Next MBS frame indicator is set to '1', i.e., if the receiver recognizes that the information included in the MBS_Data_IE transmitted through the current MBS frame is MBS data will be processed in the next MBS frame, the receiver buffers the information on the MBS data burst fields included in the MBS_Data_IE using a specific buffer, and then processes the MBS data transmitted through the MBS data burst files in the next MBS frame.

In addition, 'Next MBS MAP change indication' of the MBS_Data_IE indicates a change in size of an MBS-MAP message that will come in the next MBS frame. 'Multicast Connection Identifier (CID)' indicates multicast identifier information mapped to the MBS_Data_IE, 'OFDMA Symbol Offset' and 'Subchannel Offset' indicate start offsets of the MBS data burst fields, and 'No. Subchannels' indicates the number of subchannels of the MBS data burst fields allocated to the MBS frame. 'No. OFDMA Symbols' indicates the number of OFDMA symbols of the allocated MBS data burst fields, and 'Repetition coding indication' indicates the number of repetitions needed for decoding the MBS data transmitted through the MBS data burst fields.

'Next MBS frame offset' indicates an offset of the next MBS frame, and 'Next MBS OFDMA symbol offset' indicates an offset of a downlink frame OFDMA symbol for receiving the next MBS-MAP message. Herein, the 'Next MBS MAP change indication' being set to '1' means that the 'Next MBS OFDMA symbol offset' includes 'Next MBS No. OFDMA symbols' indicating a size of an MBS-MAP message that will come in the next MBS frame, and 'Next MBS No. OFDMA subchannels'. After receiving the 'Next MBS frame offset' and the 'Next MBS OFDMA symbol offset', the receiver can obtain MBS service information without receiving the MBS_MAP_IE of the DL-MAP: The IEs not mentioned in Table 5 are not directly related to the present invention, so a detailed description thereof will be omitted herein.

A description will now be made of a method for transmitting/receiving data using the MBS-MAP message and information on the MBS_Data_IE included in the MBS-MAP message in the communication system providing MBS according to the present invention.

Figure 3:
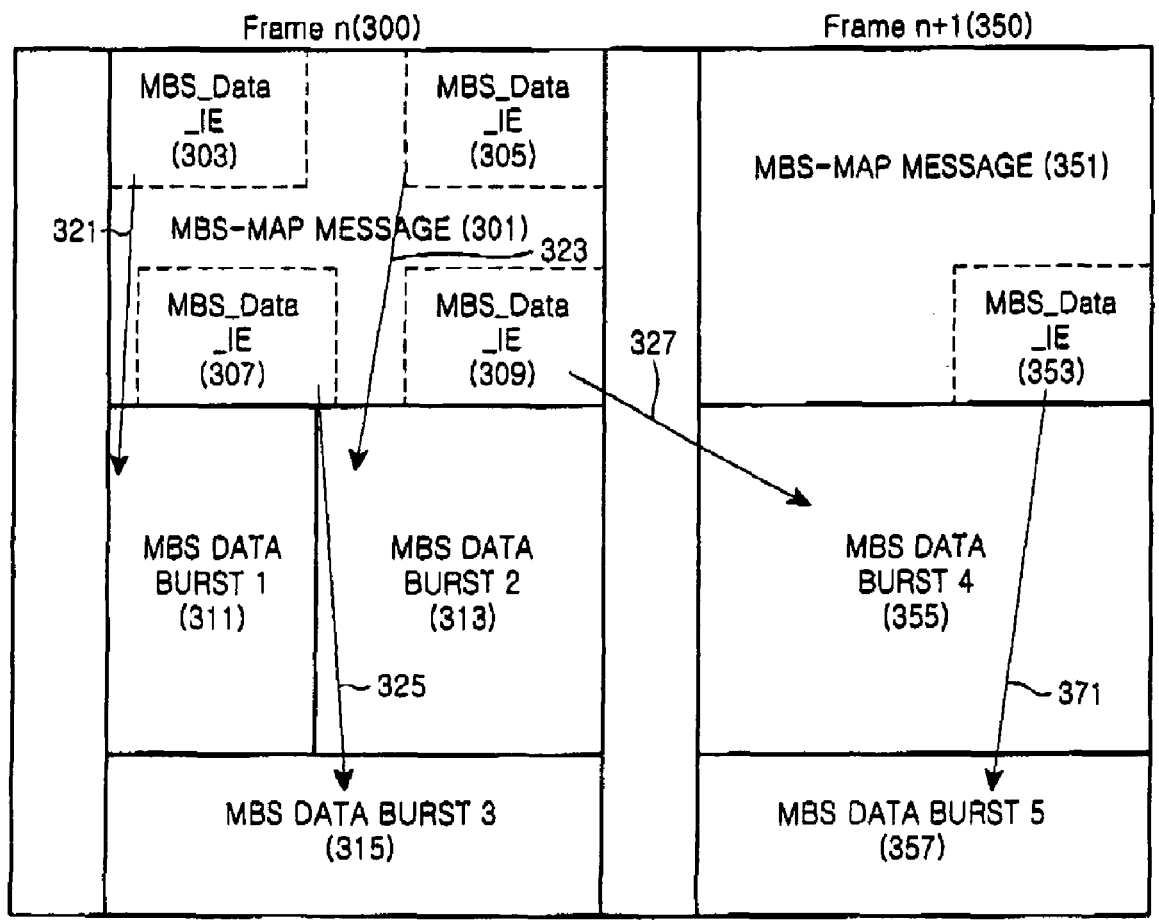
FIG. 3 is a diagram illustrating a structure of an MBS frame in a communication system providing MBS according to the present invention.

FIG. 3 is a diagram illustrating a structure of an MBS frame in a communication system providing MBS according to the present invention. For convenience, in FIG. 3, an MBS-MAP message and information on MBS data burst fields included in the MBS-MAP message are transmitted over two frames of a particular frame n and the next frame (n+1). In other words, FIG. 3 illustrates a structure of an MBS frame for the case where the Next MBS frame indicator of the MBS_Data_IE shown in Table 5 is set to '1', wherein the receiver receives MBS data by processing, or decoding the MBS data transmitted through the MBS data burst fields in the next MBS frame, recognizing that the information included in the MBS_Data_IE transmitted through the current MBS frame, i.e., the MBS frame n, is MBS data will be processed in the next MBS frame, i.e., the MBS frame (n+1). The process for the Next MBS frame indicator='1' has been described, so a description thereof will be omitted herein. Similarly, FIG. 3 illustrates only the MBS field in the downlink MBS frame of FIG. 1, for convenience.

Referring to FIG. 3, an MBS frame n 300 includes an MBS-MAP message field 301, and a plurality of MBS data burst fields of an MBS data burst 1 field 311, an MBS data burst 2 field 313 and an MBS data burst 3 field 315. The MBS-MAP message field 301 includes MBS_Data_IE fields 303, 305, 307 and 309 for processing the MBS data burst fields. In addition, an MBS frame (n+1) 350, the next frame of the MBS frame n 300, includes an MBS-MAP message field 351, and a plurality of MBS data burst fields of an MBS data burst 4 field 355 and an MBS data burst 5 field 357. The MBS-MAP message field 351 includes an MBS_Data_IE 353. The MBS_Data_IE transmitted through the MBS_Data_IE fields 303, 305, 307 and 309 included in the MBS-MAP message field 301 of the MBS frame n 300 includes information on the MBS data burst fields 311, 313, 315 and 355. In addition, the MBS_Data_IE transmitted through the MBS_Data_IE field 353 included in the MBS-MAP message field 351 of the MBS frame (n+1) 350 includes information on the MBS data burst fields 357.

Because the MBS data burst fields 311, 313, 315 and 355 mapped to the MBS_Data_IE transmitted through the MBS_Data_IE fields 303, 305, 307 and 309 included in the MBS-MAP message field 301 of the MBS frame n 300 cannot be wholly allocated to one MBS frame, i.e., the MBS frame n 300, the MBS data burst fields 311, 313, 315 and 355 are allocated to the current MBS frame, i.e., MBS frame n 300, and the next frame, i.e., MBS frame (n+1) 350. At this time, the receiver determines whether the MBS data burst fields 311, 313, 315 and 355 are allocated to the MBS frame n 300 and the MBS frame (n+1) 350, using the Next MBS frame indicator of the MBS_Data_IE transmitted through the MBS_Data_IE fields 303, 305, 307 and 309 included in the MBS-MAP message field 301.

That is, upon receiving the MBS frame n 300, the receiver checks the allocation information of the MBS data burst 1 field 311, the MBS data burst 2 field 313, the MBS data burst 3 field 315 received in the current MBS frame, i.e., MBS frame n 300, using the MBS_Data_IE transmitted through the MBS_Data_IE fields 303, 305 and 307 included in the MBS-MAP message field 301 of the MBS frame #n 300, and decodes the MBS data transmitted through each of the allocated MBS data burst fields 311, 313 and 315: In addition, the receiver checks the allocation information of the MBS data burst #4 field 355 in the MBS frame (n+1) 350 using the MBS_Data_IE transmitted through the MBS_Data_IE field 309 included in the MBS-MAP message field 301 of the MBS frame n 300, and decodes MBS data transmitted through the allocated MBS data burst 4 field 355 in the MBS frame (n+1) frame 350.

More specifically, the MBS data burst 4 field 355 is allocated to the MBS frame (n+1) 350, and a value of the Next MBS frame indicator in the MBS_Data_IE 309 of the MBS frame n 300 having information on the MBS data burst 4 field 355 is set to '1'. The receiver receiving the MBS frame n 300 processes, or decodes, the MBS data transmitted through the MBS data burst 4 field 355 allocated to the MBS frame (n+1) 350 upon receipt of the MBS frame (n+1) 350, recognizing that the MBS data burst 4 field 355 is allocated to the next MBS frame, i.e., the MBS frame (n+1) 350.

In addition, the receiver receiving the MBS frame (n+1) 350 checks the allocation information of the MBS data burst 5 field 357 received in the current MBS frame, i.e., the MBS frame (n+1) 350, using the MBS_Data_IE transmitted through the MBS_Data_IE field 353 included in the MBS-MAP message field 351 of the MBS frame (n+1) 350, and decodes the MBS data transmitted through the allocated MBS data burst 5 field 357. FIG. 3 illustrates operations 321, 323, 325, 327 and 371 of decoding the MBS data transmitted through the MBS data burst fields 311, 313, 315, 355 and 357, using the MBS_Data_IE in each frame.

Figure 4:
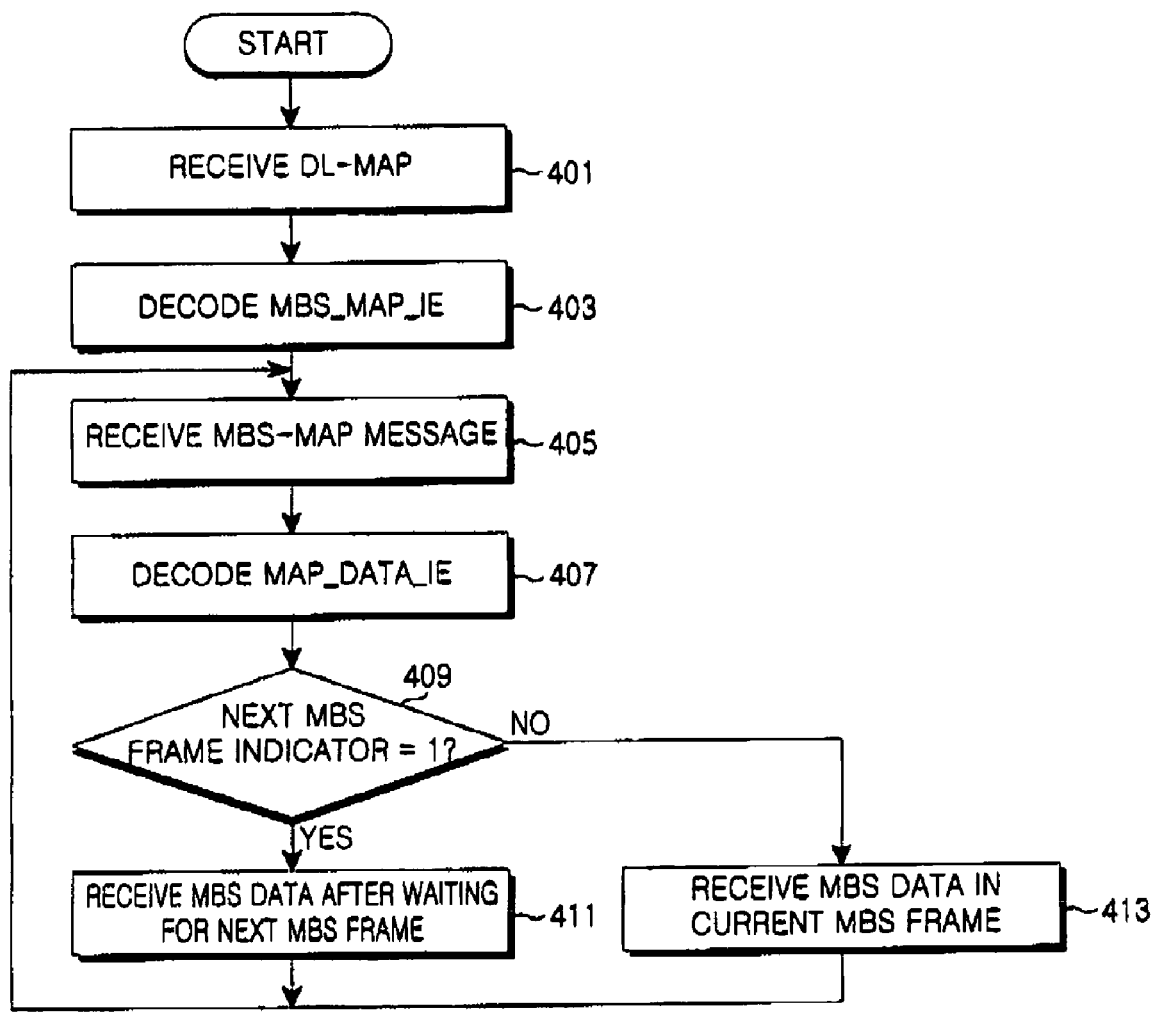
FIG. 4 is a flowchart illustrating an operation of a receiver in a communication system providing MBS according to the present invention.

FIG. 4 is a flowchart illustrating an operation of a receiver in a communication system providing MBS according to the present invention.

Referring to FIG. 4, in step 401, a receiver receives a DL-MAP message transmitted from a transmitter through a DL-MAP message field allocated to an MBS frame. In step 403, if a DIUC value of the received DL-MAP message shown in Table 4 is set to '0x0A', the receiver decodes an MBS_MAP_IE transmitted through an MBS_MAP_IE field included in the DL-MAP message. Thereafter, in step 405, the receiver acquires location information and decoding information of an MBS-MAP message from the received MBS_MAP_IE, and receives an MBS-MAP message transmitted from the transmitter through an MBS-MAP message field allocated to the MBS frame. A format of the received MBS-MAP message is shown in Table 4.

Next, in step 407, the receiver decodes an MBS_Data_IE including the information on the MBS data burst fields in the MBS frame. That is, the receiver receives an MBS_Data_IE transmitted through the MBS_Data_IE field included in the MBS-MAP message field. In step 409, the receiver determines whether a Next MBS frame indicator of the received MBS_Data_IE shown in Table 5 is set to '1'. If it is determined in step 409 that the Next MBS frame indicator is set to '1', the receiver proceeds to step 411. However, if the Next MBS frame indicator is set to '0', the receiver proceeds to step 413.

In step 411, after waiting from an MBS frame, i.e., the current MBS frame, received at the present time until the time that the next MBS frame is received, the receiver processes, or decodes the MBS data transmitted through the MBS data burst fields allocated to the current MBS frame and the next MBS frame using information included in the MBS_Data_IE transmitted through an MBS_Data_IE field included in each MBS-MAP message of the current MBS frame and the next MBS frame. The method of processing, or decoding, data transmitted through the MBS data burst fields allocated to the two frames has been described above, so a detailed description will be omitted herein.

Meanwhile, in step 413, the receiver processes, or decodes, MBS data transmitted through MBS data burst fields allocated to the current MBS frame using information included in an MBS_Data_IE in the current MBS frame. The method of processing, or decoding data transmitted through the MBS data burst fields allocated to the one frame has also been described above, so a detailed description will be omitted herein. After processing the MBS data transmitted through the MBS data burst fields allocated to each MBS frame in steps 411 and 413, if the receiver continues to receive the MBS provided from the transmitter, the process returns to step 405 and repeats the operation of step 405 and its succeeding steps.

In FIG. 4, the receiver determines whether the information on the MBS data burst fields included in the MBS_Data_IE of the MBS-MAP message corresponds to the current MBS frame or both of the current MBS frame and the next MBS frame, i.e., whether MBS data burst fields are allocated to two consecutive MBS frames, and then processes, or decodes, the MBS data transmitted through the allocated MBS data burst fields according to the determination results. After receiving the MBS-MAP message in the current MBS frame, the receiver receiving MBS provided from the transmitter may receive MBS data transmitted through MBS data burst fields allocated to an MBS frame following more than two MBS frames including the current MBS frame.

That is, the information on the MBS data burst fields included in the MBS_Data_IE of the MBS-MAP message in the current MBS frame may not only be the current MBS frame or both of the current frame and the next frame but also be the information on the MBS data burst fields allocated to the frame transmitted after the next frame. In this case, the receiver should process, or decode, the data transmitted through the MBS data burst fields in real time.

A description will now be made of a method for decoding received MBS data by a receiver in the case where the information on the MBS data burst fields included in the MBS_Data_IE of the MBS-MAP message in the current MBS frame is not only the current MBS frame or both of the current MBS frame and the next frame but also the information on the MBS data burst fields allocated to the frame transmitted after the next frame in the communication system providing MBS according to the present invention.

In the above case, in the communication system according to the present invention, the receiver previously receives information on the MBS data burst fields to be allocated to the frame following at least two frames through the MBS-MAP message transmitted in the current MBS frame. Thereafter, the receiver decodes the MBS data transmitted through the MBS data burst fields allocated to the frame following the at least two frames using the previously received information. Therefore, the MBS-MAP message transmitted through the MBS-MAP message field allocated to the MBS frame includes information indicating how many frames later from the current MBS frame the frame in which MBS data transmitted through the MBS data burst fields is decoded is located. A format of the MBS_Data_IE including such information is shown in Table 6 below.

TABLE 6

| Syntax | Size (bits) | Notes |
| --- | --- | --- |
| MBS_DATA_IE { | | |
|   MBS-MAP-Type=0 | 2 | MBS_DATA_IE |
|   MBS_Burst_Frame_Offset | 2 | This indicates the burst indicated by this IE will be shown after MBS_Burst_Frame_offset + 2 frames. |
|   Next MBS MAP change indication | 1 | This indicates whether the size of MBS MAP message of next MBS frame for these multicast CIDs included this IE will be different from the size of this MBS MAP message. |
|   No. of Multicast CID | 3 | |
|   For(i=o; i<No. of Multicast CIDs; i++) { | | |
|     Multicast CID | 12 | 12 LSBs of CID for multicast |
|   } | | |
|   MBS DIUC | 4 | |
|   OFDMA symbol offset | 8 | OFDMA symbol offset with respect to start of the next (MBS_Burst_Frame_offset +2)th frame |

TABLE 6-continued

| Syntax | Size (bits) | Notes |
| --- | --- | --- |
| Subchannel offset | 6 | OFDMA subchannel offset with respect to start of the next (MBS_Burst_Frame_offset +2)th frame |
| Boosting | 3 | |
| No. OFDMA symbols | 7 | The size of MBS data |
| No. subchannels | 6 | |
| Repetition coding indication | 2 | 0b00=No repetition coding<br>0b01=Repetition coding of 2 used<br>0b10=Repetition coding of 4 used<br>0b11=Repetition coding of 6 used |
| Next MBS frame offset | 8 | The Next MBS frame offset value is lower 8 bits of the frame number in which the BS shall transmit the next MBS frame. |
| Next MBS OFDMA symbol offset | 8 | The offset of the OFDMA symbol in which the next MBS portion starts, measured in OFDMA symbols from the beginning of the downlink frame in which the MBS-MAP is transmitted. |
| If(Next MBS MAP change indication=1) { | | |
| Next MBS No. OFDMA symbols | 2 | It is to indicate the size of MBS_MAP message in Next MBS portion where the BS shall transmit the next MBS frame for multicast CIDs in this IE. |
| Next MBS No. OFDMA subchannels | 6 | It is to indicate the size of MBS_MAP message in Next MBS portion where the BS shall transmit the next MBS frame for multicast CIDs in this IE. |
| } } | | |

Table 6 shows IEs of the MBS_Data_IE transmitted through the MBS_Data_IE field. The MBS_Data_IE is included in the MBS-MAP message, and includes information on the MBS data transmitted from the transmitter to the receiver through the MBS data burst fields of the MBS frame. Herein, MBS_MAP Type='0' means that the MBS_Data_IE is transmitted through the MBS_Data_IE field, MBS_MAP Type='1' means that MBS_Data_Time_Diversity_IE is transmitted through the MBS_Data_IE field, and MBS_MAP Type='2' means that an Extended MBS_MAP_Information Element (Extended MBS_MAP_IE) is transmitted through the MBS_Data_IE field. For both MBS_MAP Type='0' and '2', because the MBS_Data_IE is transmitted through the MBS_Data_IE field and IEs for both cases are identical to each other, the following description will be given for the MBS_MAP Type='0', for convenience.

A detailed description of the MBS_MAP Type='1' in which the MBS_Data_Time_Diversity_IE is transmitted through the MBS_Data_IE field will be made later with reference to Table 7 below.

The MBS_Data_IE includes MBS_Burst_Frame_Offset indicating how many frames later from the frame where the current MBS-MAP message is received the MBS data burst field is allocated, i.e., indicating how many frames later from the current MBS frame the MBS data the MBS data will be received at the receiver. After decoding the MBS_Data_IE, the receiver recognizes the possibility of processing, or decoding the MBS data transmitted through MBS data burst fields allocated to an frame received more than two frames later from the MBS frame where the MBS_Data_IE is received.

In other words, for MBS_Burst_Frame_Offset='0', the receiver receives MBS data transmitted through MBS data burst fields allocated to an frame received the two frames later, recognizing the possibility of receiving MBS data through MBS data burst fields allocated to an frame following two frames later from the MBS frame where the MBS_Data_IE is received. For MBS_Burst_Frame_Offset='1', the receiver receives MBS data transmitted through MBS data burst fields allocated to an frame received the three frames later, recognizing the possibility of receiving MBS data through MBS data burst fields allocated to an frame following three frames later from the MBS frame where the MBS_Data_IE is received.

Similarly, for MBS_Burst_Frame_Offset='2' or '3', the receiver receives MBS data transmitted through MBS data burst fields allocated to an frame received four or five frames later.

Table 6 shows an exemplary case where the receiver receives MBS data transmitted through MBS data burst fields allocated to an frame corresponding to each MBS_Burst_Frame_Offset value, wherein the receiver receives MBS data transmitted through MBS data burst fields allocated to an frame following two frames. However, it is also possible to extend the two frames to four frames, six frames, eight frames, and so on. The frame corresponding to the MBS_Burst_Frame_Offset value is a factor that varies according to the system situations or characteristics. The IEs not mentioned in Table 6 have been described in detail with reference to Table 5.

In the case where receivers supporting an HARQ scheme receive MBS service from a transmitter, the transmitter transmits an MBS_Data_Time_Diversity_IE instead of the MBS_Data_IE to the receivers 10 along with the MBS-MAP message. A format of the MBS_Data_Time_Diversity_IE included in the MBS-MAP message is shown in Table 7 below.

TABLE 7

| Syntax | Size (bits) | Notes |
|---|---|---|
| MBS_DATA_Time_Diversity_IE( ) { | | |
|   MBS_MAP_Type=1 | 2 | MBS_DATA_Time_Diversity_IE |
|   MBS_Burst_Frame_Offset | 2 | This indicates the burst indicated by this IE will be shown after MBS_Burst_Frame_Offset +2 frames. |
|   Multicast CID | 12 | |
|   OFDMA symbol offset | 8 | This indicates starting position of the region of MBS Bursts with respect to start of the next (MBS_Burst_Frame_Offset +2)th frame |
|   N_EP code | 4 | |
|   N_SCH code | 4 | |
|   AI_SN | 1 | |
|   SPID | 2 | |
|   ACID | 4 | |
|   Next MBS MAP change indication | 1 | This indicates whether the size of MBS MAP message of next MBS frame for these multicast CIDs included this IE will be different from the size of this MBS MAP message. |
|   Next MBS frame offset | 8 | |
|   Next MBS OFDMA symbol offset | 8 | |
|   If(Next MBS MAP change indication=1) { | | |
|     Next MBS No. OFDMA symbols | 2 | It is to indicate the size of MBS_MAP message in Next MBS portion where the BS shall transmit the next MBS frame for multicast CIDs in this IE. |
|     Nest MBS No. OFDMA subchannels | 6 | It is to indicate the size of MBS_MAP message in Next MBS portion where the BS shall transmit the next MBS frame for multicast CIDs in this IE. |
|   } | | |
| } | | |

Table 7 shows IEs of the MBS_Data_Time_Diversity_IE transmitted instead of the MBS_Data_IE transmitted through the MBS_Data_IE field included in the MBS-MAP message field of the MBS frame, and the MBS_Data_Time_Diversity_IE is transmitted through the MBS_Data_IE field included in the MBS-MAP message field in which MBS_Data_IE is transmitted. In the MBS_Data_Time_Diversity_IE, MBS_MAP_Type indicates that IEs of Table 7 are MBS_Data_Time_Diversity_IE. Further, MBS_Burst_Frame_Offset indicates an MBS_Burst_Frame_Offset indicating how many frames later from the frame where the current MBS-MAP message is received, i.e., from the current MBS frame, the MBS data burst fields will be allocated. 'Multicast CID' indicates information on a multicast identifier mapped to the MBS_Data_Time_Diversity_IE, and 'OFDMA symbol offset' indicates a start offset of MBS data burst fields allocated to the frame.

'N_EP code', 'N_SCH code', 'ARQ Identifier_Sequence Number (AI_SN)', 'Sub_Packet IDentifier (SPID)' and 'Hybrid ARQ Channel IDentifier (ACID)' indicate information used for decoding the HARQ data. 'Next MBS MAP change indication' indicates any change in MBS-MAP message to be transmitted through an MBS-MAP message field in the next MBS frame, and 'Next MBS frame offset' indicates an offset of the next MBS frame. 'Next MBS OFDMA symbol offset' indicates an offset of a downlink frame OFDMA symbol for receiving an MBS-MAP message transmitted through the next MBS frame. Next MBS MAP change indication='1' indicates that it includes 'Next MBS No. OFDMA symbols' indicating a size of an MBS-MAP message that will be transmitted through the next MBS frame, and 'Next MBS No. OFDMA subchannels'.

Moreover, after receiving the Next MBS frame offset and the Next MBS OFDMA symbol offset, the receiver can obtain MBS information without receiving the MBS_MAP_IE of the DL-MAP message. Further, after decoding the MBS_Data_Time_Diversity_IE, the receiver recognizes the possibility of receiving MBS data transmitted through MBS data burst fields allocated to an frame received more than two frames later from the MBS frame where the MBS_Data_Time_Diversity_IE is received.

In other words, for MBS_Burst_Frame_Offset='0', the receiver processes, or decodes MBS data transmitted through MBS data burst fields allocated to an frame received the two frames later, recognizing the possibility of receiving the MBS data transmitted through MBS data burst frames allocated to an frame following two frames. For MBS_Burst_Frame_Offset='1', the receiver processes, or decodes, MBS data transmitted through MBS data burst fields allocated to an frame received the three frames later, recognizing the possibility of receiving the MBS data transmitted through MBS data burst frames allocated to an frame following three frames.

Similarly, for MBS_Burst_Frame_Offset='2' or '3', the receiver receives MBS data transmitted through MBS data burst fields allocated to an frame received four or five frames later. As mentioned above, Table 6 shows an exemplary case where the receiver receives MBS data transmitted through MBS data burst fields allocated to an frame corresponding to each MBS_Burst_Frame_Offset value, wherein the receiver receives the MBS data transmitted through MBS data burst fields allocated to an frame following two frames. However, it is also possible to extend the two frames to four frames, six frames, eight frames, and so on. The frame corresponding to the MBS_Burst_Frame_Offset value is a factor that varies according to the system situations or characteristics. The IEs not mentioned in Table 6 have been described in detail with reference to Table 5.

Figure 5:
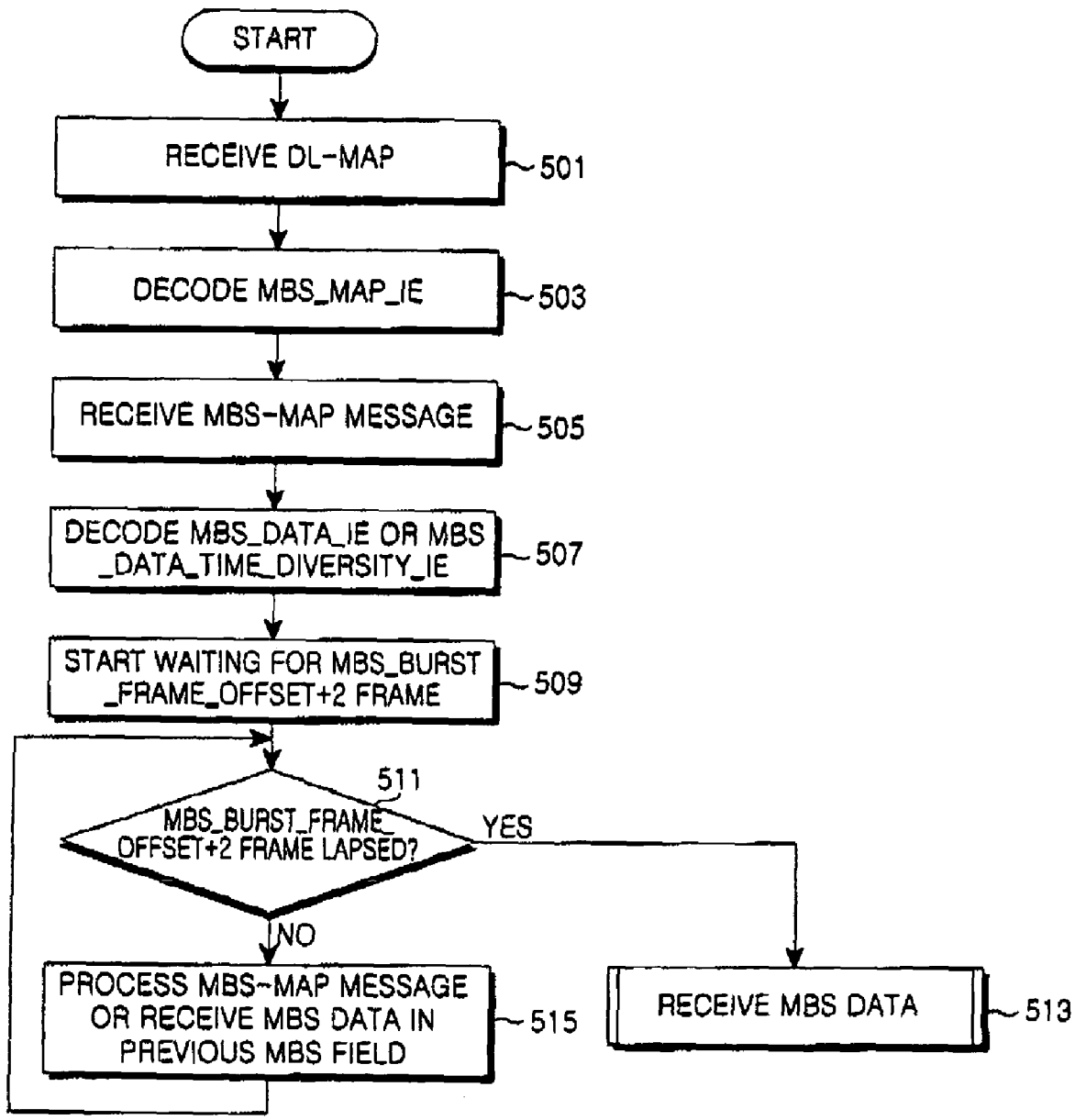
FIG. 5 is a flowchart illustrating an operation of a receiver in a communication system providing MBS according to another embodiment of the present invention.

FIG. 5 is a flowchart illustrating an operation of a receiver in a communication system providing MBS according to the present invention.

Referring to FIG. 5, in step 501, a receiver receives a DL-MAP message transmitted from a transmitter through a DL-MAP message field allocated to an MBS frame. In step 503, if a DIUC value of the received DL-MAP message shown in Table 4, Table 5 and Table 6 is set to '0×0A', the receiver decodes an MBS_MAP_IE transmitted through an MBS_MAP_IE field included in the DL-MAP message. Thereafter, in step 505, the receiver acquires location information and decoding information of an MBS-MAP message from the received MBS_MAP_IE, and receives an MBS-MAP message transmitted from the transmitter through an MBS-MAP message field allocated to the MBS frame. A format of the received MBS-MAP message is shown in Table 2, Table 4.

Next, in step 507, the receiver decodes an MBS_Data_IE or an MBS_Data_Time_Diversity_IE that include information on MBS data burst fields in the MBS frame. That is, the receiver receives the MBS_Data_IE or the MBS_Data_Time_Diversity_IE transmitted through an MBS_Data_IE field included in an MBS-MAP message field. A format of the MBS_Data_IE is shown in Table 6, and a format of the MBS_Data_Time_Diversity_IE is shown in Table 7.

Thereafter, in step 509, the receiver recognizes an expected reception time of MBS data transmitted through the MBS data burst fields allocated to the frame using MBS_Burst_Frame_Offset information included in the MBS_Data_IE or the MBS_Data_Time_Diversity_IE received in step 507. That is, the receiver recognizes the possibility of receiving the MBS data transmitted through MBS data burst fields allocated to an frame following MBS_Burst_Frame_Offset+2 frames, for example, an frame following two or three frames, and waits for the frame where the MBS data is transmitted through MBS data burst fields actually allocated to the corresponding frame.

In step 511, the receiver determines whether the MBS_Burst_Frame_Offset+2 frames have elapsed. If it is determined in step 511 that MBS_Burst_Frame_Offset+2 frames have elapsed, the receiver proceeds to step 513. In step 513, the receiver processes, or decodes, MBS data transmitted through MBS data burst fields actually allocated to an frame following the MBS_Burst_Frame_Offset+2 frames. However, if it is determined in step 511 that the MBS_Burst_Frame_Offset+2 frames have not elapsed, the receiver proceeds to step 515.

In step 515, the receiver processes an MBS-MAP message transmitted through the next MBS frame, or processes MBS data transmitted through MBS data burst fields of the previous frame, i.e., MBS data transmitted through MBS data burst fields allocated in the current frame corresponding to the information on the MBS data burst fields previously received before the current frame is transmitted. As a result, the receiver can perform an operation in the next MBS frame according to a Next MBS Frame offset included in the MBS_Data_IE or the MBS_Data_Time_Diversity_IE decoded in step 507. This corresponds to the case where a value of the MBS Burst Frame Offset+2 frames is greater than the Next MBS Frame offset.

Alternatively, in step 515, if MBS data burst fields where MBS data is transmitted are allocated within MBS Burst Frame Offset+2 frames from the current MBS frame based on the MBS Burst Frame Offset provided from the MBS_Data_IE or the MBS_Data_Time_Diversity_IE included in the MBS-MAP message of the previous MBS frame, the receiver receives MBS data transmitted through the MBS data burst fields. As a result, the receiver receives MBS data transmitted through MBS data burst fields allocated to an frame following a predetermined frame using the MBS_Burst_Frame_Offset in the MBS_Data_IE and the MBS_Data_Time_Diversity_IE shown in Table 6 and Table 7.

Figure 6:
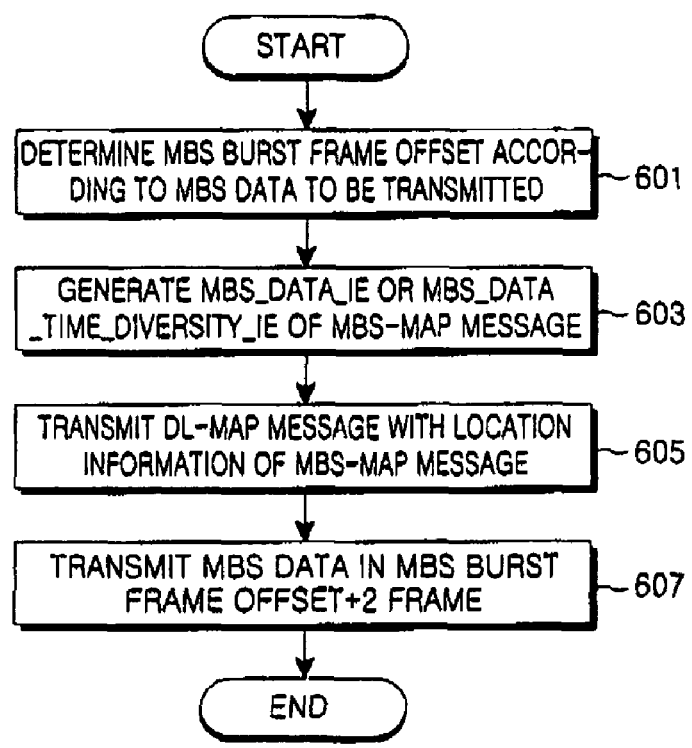
FIG. 6 is a flowchart illustrating an operation of a transmitter in a communication system providing MBS according to the present invention.

FIG. 6 is a flowchart illustrating an operation of a transmitter in a communication system providing MBS according to the present invention.

Referring to FIG. 6, in step 601, a transmitter determines an MBS Burst Frame Offset value according to the MBS data to be transmitted to a receiver, in order to allocate the MBS data burst fields, in which the MBS data is transmitted, to an frame. Thereafter, in step 603, the transmitter generates an MBS_Data_IE or an MBS_Data_Time_Diversity_IE of an MBS-MAP message including the determined MBS Burst Frame Offset value as shown in Table 6 or Table 7.

In step 605, the transmitter transmits a DL-MAP message including location information of an MBS-MAP message with the generated MBS_Data_IE or MBS_Data_Time_Diversity_IE. Herein, the location information of the MBS-MAP message includes location information of an MBS-MAP message field and an MBS_Data_IE field included the MBS-MAP message field in the downlink MBS frame, and a plurality of MBS data burst fields. That is, in step 605, the transmitter transmits all information for the MBS data transmission/reception to the receiver so that the receiver may process, or decode, the MBS data that the transmitter itself provides to the receiver. Thereafter, in step 607, the transmitter transmits MBS data to the receiver through the corresponding MBS data burst fields in MBS Burst Frame Offset+2 frames according to the MBS_Data_IE or the MBS_Data_Time_Diversity_IE included in the MBS-MAP message.

As can be understood from the foregoing description, the present invention newly defines a service MAP message and a service data information element according to the service data to be transmitted to a receiver receiving communication service in a communication system. This contributes to an increase in resource efficiency during the transmission of the service MAP message and a reduction in overhead due to the service MAP message. The receiver recognizes the frame where the service data is transmitted by receiving the newly defined service MAP message and service data information elements. As a result, the receiver can decode the service data without error. In addition, a transmitter transmits the newly defined service MAP message and service data information elements to the receiver, to inform the receiver of a decoding time of the service data, thereby enabling real-time service data processing between the transmitter and the receiver and thus reducing the required transmission/reception load.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting Multicast Broadcast Service (MBS) data, by a Base Station (BS), in a communication system, the method comprising the steps of:
    determining a burst frame offset for an MBS data burst, wherein a frame including the MBS data burst is an n-th frame following a current frame including the burst frame offset;
    determining a position of the MBS data burst within the n-th frame;

setting information of the burst frame offset and the position in a MAP message representing resource allocation information for the MBS data; and transmitting the MAP message to a mobile station using the current frame, wherein the burst frame offset represents an offset between the current frame including the MAP message and the frame including the MBS data burst and indicates that the MBS data burst is located after the burst frame offset plus 2 frames.

2. The method of claim 1, wherein 'n' is equal to a sum of the burst frame offset and a predetermined minimum frame offset value.

3. The method of claim 1, wherein the information of the position comprises information relating to an Orthogonal Frequency Division Multiple Access (OFDMA) symbol offset and a subchannel offset within the n-th frame.

4. The method of claim 1, further comprising transmitting the MBS data burst using the n-th frame.

5. A method for receiving Multicast Broadcast Service (MBS) data by a Subscriber Station (SS) in a communication system, the method comprising:

receiving a MAP message representing resource allocation information for the MBS data in a current frame; and decoding the MAP message, wherein the MAP message includes information of a burst frame offset for an MBS data burst in a data burst frame, wherein the data burst frame including the MBS data burst is an n-th frame following the current frame, wherein the MAP message further includes information of a position of the MBS data burst within the n-th frame, and wherein the burst frame offset represents an offset between the current frame including the MAP message and the data burst frame including the MBS data burst and indicates that the MBS data burst is located after the burst frame offset plus 2 frames.

6. The method of claim 5, wherein 'n' is equal to a sum of the burst frame offset and a predetermined minimum frame offset value.

7. The method of claim 5, wherein the position information comprises information relating to an Orthogonal Frequency Division Multiple Access (OFDMA) symbol offset and a subchannel offset within the n-th frame.

8. The method of claim 5, further comprising receiving the MBS data burst in the n-th frame according to the MAP message.

9. An apparatus for transmitting Multicast Broadcast Service (MBS) data in a communication system, comprising:

a processor for determining a burst frame offset for an MBS data burst such that, a frame including the MBS data burst is an n-th frame following a current frame including the burst frame offset, determining a position of the MBS data burst within the n-th frame, and setting information of the burst frame offset and the position in a MAP message representing resource allocation information for the MBS data; and a transmitter for transmitting the MAP message to a receiver using the current frame, wherein the burst frame offset represents an offset between the current frame including the MAP message and the frame including the MBS data burst and indicates that the MBS data burst is located after the burst frame offset plus 2 frames.

10. The apparatus of claim 9, wherein 'n' is equal to a sum of the burst frame offset and a predetermined minimum frame offset value.

11. The apparatus of claim 9, wherein the information of the position comprises information relating to an Orthogonal Frequency Division Multiple Access (OFDMA) symbol offset and a subchannel offset within the n-th frame.

12. The apparatus of claim 9, wherein the transmitter transmits the MBS data burst using the n-th frame.

13. An apparatus for receiving Multicast Broadcast Service (MBS) data in a communication system, comprising:

a receiver for receiving a MAP message representing resource allocation information for the MBS data in a current frame; and a processor for decoding the MAP message, wherein the MAP message includes information of a burst frame offset for an MBS data burst in a data burst frame, wherein the data burst frame including the MBS data burst is an n-th frame following the current frame including the burst frame offset, wherein the MAP message further comprises information of a position of the MBS data burst within the n-th frame, and wherein the burst frame offset represents an offset between the current frame including the MAP message and the data burst frame including the MBS data burst and indicates that the MBS data burst is located after the burst frame offset plus 2 frames.

14. The apparatus of claim 13, wherein 'n' is equal to a sum of the burst frame offset and a predetermined minimum frame offset value.

15. The apparatus of claim 13, wherein the position information comprises information relating to an Orthogonal Frequency Division Multiple Access (OFDMA) symbol offset and a subchannel offset within the n-th frame.

16. The apparatus of claim 13, wherein the receiver receives the MBS data burst in the n-th frame according to the MAP message.

17. A method for transmitting Multicast Broadcast Service (MBS) data by a Base Station (BS) in a communication system, the method comprising the steps of:

determining a burst frame offset for an MBS data burst and a next frame offset;

determining a position of the MBS data burst within an n-th frame following a current frame;

setting information of the burst frame offset, the next frame offset and the position in a MAP message representing resource allocation information for the MBS data; and transmitting the MAP message to a mobile station using the current frame, wherein the burst frame offset represents an offset between the current frame including the MAP message and the frame including the MBS data burst and indicates that the MBS data burst is located after the burst frame offset and plus 2 times, where 'n' is equal to a sum of the burst frame offset and a predetermined number of frames, and wherein the next frame offset indicates an information of a frame in which the BS transmits a next MBS frame comprising a next MAP message.

18. The method of claim 17, wherein the information of the position comprises information relating to an Orthogonal Frequency Division Multiple Access (OFDMA) symbol offset and a subchannel offset within the n-th frame following the current frame.

19. The method of claim 17, further comprising transmitting the MBS data burst using an n-th frame following the current frame.

20. A method for receiving Multicast Broadcast Service (MBS) data by a receiver in a communication system, the method comprising the steps of:

receiving a MAP message representing resource allocation information for the MBS data using a current frame; and
decoding the MAP message,
wherein the MAP message includes information of a burst frame offset for an MBS data burst within an n-th frame following the current frame, a next frame offset, and information of a position of the MBS data burst,
wherein the burst frame offset represents an offset between the current frame including the MAP message and a frame including the MBS data burst and indicates that the MBS data burst is located after the burst frame offset plus 2 frames, where 'n' is equal to a sum of the burst frame offset and a predetermined number of frames, and
wherein the next frame offset indicates information of a frame in which the BS transmits a next MBS frame comprising a next MAP message.

21. The method of claim 20, wherein the position information comprises information relating to an Orthogonal Frequency Division Multiple Access (OFDMA) symbol offset and a subchannel offset within the n-th frame following the current frame.

22. The method of claim 20, further comprising receiving the MBS data burst in the n-th frame following the current frame according to the MAP message.

23. An apparatus for transmitting Multicast Broadcast Service (MBS) data in a communication system, comprising:
a processor for determining a burst frame offset for an MBS data burst and a next frame offset, determining a position of the MBS data burst within an n-th frame following a current frame, and setting information of the frame offset and the position in a MAP message representing resource allocation information for the MBS data; and
a transmitter for transmitting the MAP message to the receiver using the current frame,
wherein the burst frame offset represents an offset between the current frame including the MAP message and a frame including the MBS data burst and indicates that the MBS data burst is located after the burst frame offset plus 2 frames, where 'n' is equal to a sum of the burst frame offset and a predetermined number of frames, and
wherein the next frame offset indicates information of a frame in which the BS transmits a next MBS frame comprising a next MAP message.

24. The apparatus of claim 23, wherein the information of the position comprises information relating to an Orthogonal Frequency Division Multiple Access (OFDMA) symbol offset and a subchannel offset within the n-th frame following the current frame.

25. The apparatus of claim 23, wherein the transmitter transmits the MBS data burst using the n-th frame following the current frame.

26. An apparatus for Multicast Broadcast Service (MBS) data in a communication system, comprising:
a receiver for receiving a MAP message representing resource allocation information for the MBS data using a current frame; and
a processor for decoding the MAP message,
wherein the MAP message includes information of a burst frame offset for an MBS data burst within an n-th frame following the current frame, a next frame offset, and information of a position of the MBS data burst,
wherein the burst frame offset represents an offset between the current frame including the MAP message and a frame including the MBS data burst and indicates that the MBS data burst is located after the burst frame offset plus 2 frames, where 'n' is equal to a sum of the burst frame offset and a predetermined number of frames, and
wherein the next frame offset indicates information of a frame in which the BS transmits a next MBS frame comprising a next MAP message.

27. The apparatus of claim 26, wherein the position information comprises information relating to an Orthogonal Frequency Division Multiple Access (OFDMA) symbol offset and a subchannel offset within the n-th frame following the current frame.

28. The apparatus of claim 26, wherein the receiver receives the MBS data burst in the n-th frame following the current frame according to the MAP message.

\* \* \* \* \*